Feb. 14, 1967     A. KERNICK ETAL     3,304,484
VALVE EXTINGUISHING NETWORK FOR INVERTERS
Filed Dec. 13, 1965     8 Sheets-Sheet 1

INVENTORS
Andress Kernick and
Theodore M. Heinrich.
BY
John L. Stoughton
ATTORNEY

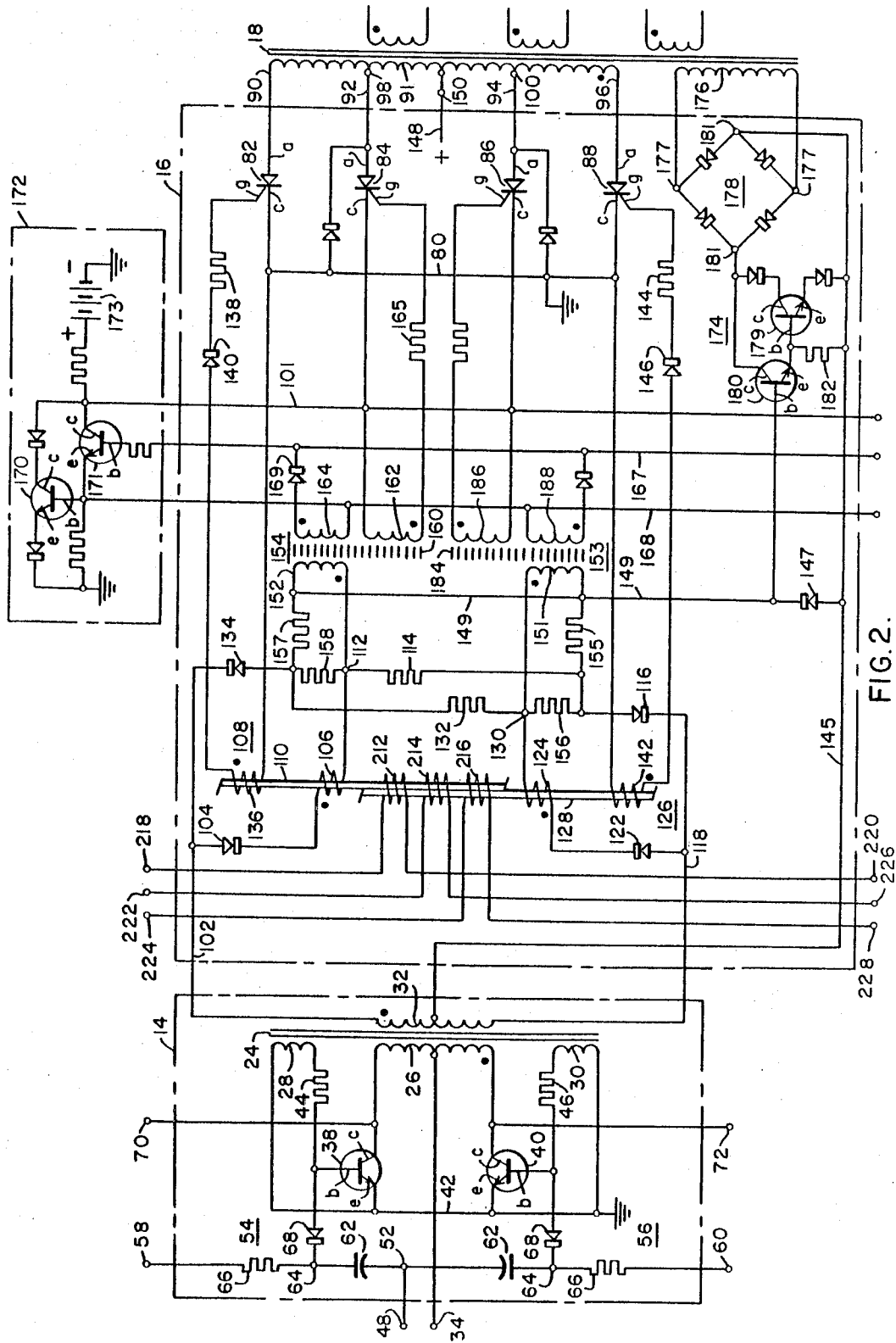

Feb. 14, 1967  A. KERNICK ETAL  3,304,484
VALVE EXTINGUISHING NETWORK FOR INVERTERS
Filed Dec. 13, 1965  8 Sheets-Sheet 6

United States Patent Office 3,304,484
Patented Feb. 14, 1967

3,304,484
VALVE EXTINGUISHING NETWORK FOR INVERTERS
Andress Kernick and Theodore M. Heinrich, both of Lima, Ohio, assignors to Westinghouse Electric Corporation, Pittsburgh, Pa., a corporation of Pennsylvania
Filed Dec. 13, 1965, Ser. No. 513,385
24 Claims. (Cl. 321—5)

This application is a continuation-in-part of copending application Serial No. 118,030, filed June 19, 1961, for Inverter, now forfeited.

This invention relates generally to inverters and more particularly those which utilize the discontinuous control or thyratron type of valve device in which provision must be made for extinguishing the conducting one of the valves prior to the initiation of conduction of another one of the valves.

An object of this invention is to provide a new and improved apparatus of the character described.

A further object is to provide a single shut-off or turn-off device which may be used sequentially by the various power stages which make up the inverter apparatus.

A further object of this invention is to provide a device in which the valve which control the power output of the power stages are shunted by additional valve devices whereby the current through the power transmitting valves are caused to fall below the minimum value required to sustain conduction therein and thereafter terminating conduction through the shunting devices.

A still further object is to provide means for sequentially connecting to a plurality of valve controlled power stages, a single current extinguishing network which initially conducts to reduce the current flow through the power stage valve of the particular power stage to which it is then connected and which thereafter reduces the current flow through the extinguishing network.

Still another object is to connect such an extinguishing network through discontinuous control type valves which are rendered non-conducting to disconnect the extinguishing network upon a predetermined reduction in the current flow through the extinguishing network.

Another object is to provide such an extinguishing network which will reduce the current flow therethrough sufficiently to disconnect the extinguishing network from each of the power stages to which it is connected prior to its connection to the next power stage whereby it is connected solely to one power stage at any given instant.

Another object is to provide such an extinguishing network with a reversibly chargeable storage device which discharges to interrupt the current flow through the power stage valve and reaches a charged condition to disconnect the extinguished power stage from the inverter.

A still further object is to use a capacitor which is charged and discharged through an inductance as the storage device and current interrupter.

A still further object of this invention is to provide a pair of phase displaced series of signals for sequentially rendering the power stage valves conducting and sequentially connecting the extinguishing network to the power stages.

Another object of the invention is to provide an improved starting arrangement for initiating the operation of an inverter comprising a plurality of power stages.

A still further object of the invention is to provide in such a starting arrangement for power stages containing inductive devices, means for insuring that the inductive devices will not saturate and that the storage device of the extinguishing network is charged to the proper polarity and potential.

Other objects of this invention will be apparent from the description, the appended claims and the drawings in which drawings:

FIGURES 1A and 1B collectively illustrate an inverter embodying the invention;

FIG. 2 is a schematic diagram illustrating the inverter stages and the coupling thereof to the turn-off apparatus;

FIGS. 3A, 3B and 3C, when placed side-by-side collectively, illustrate an inverter embodying another form of the invention;

Figure 1A:
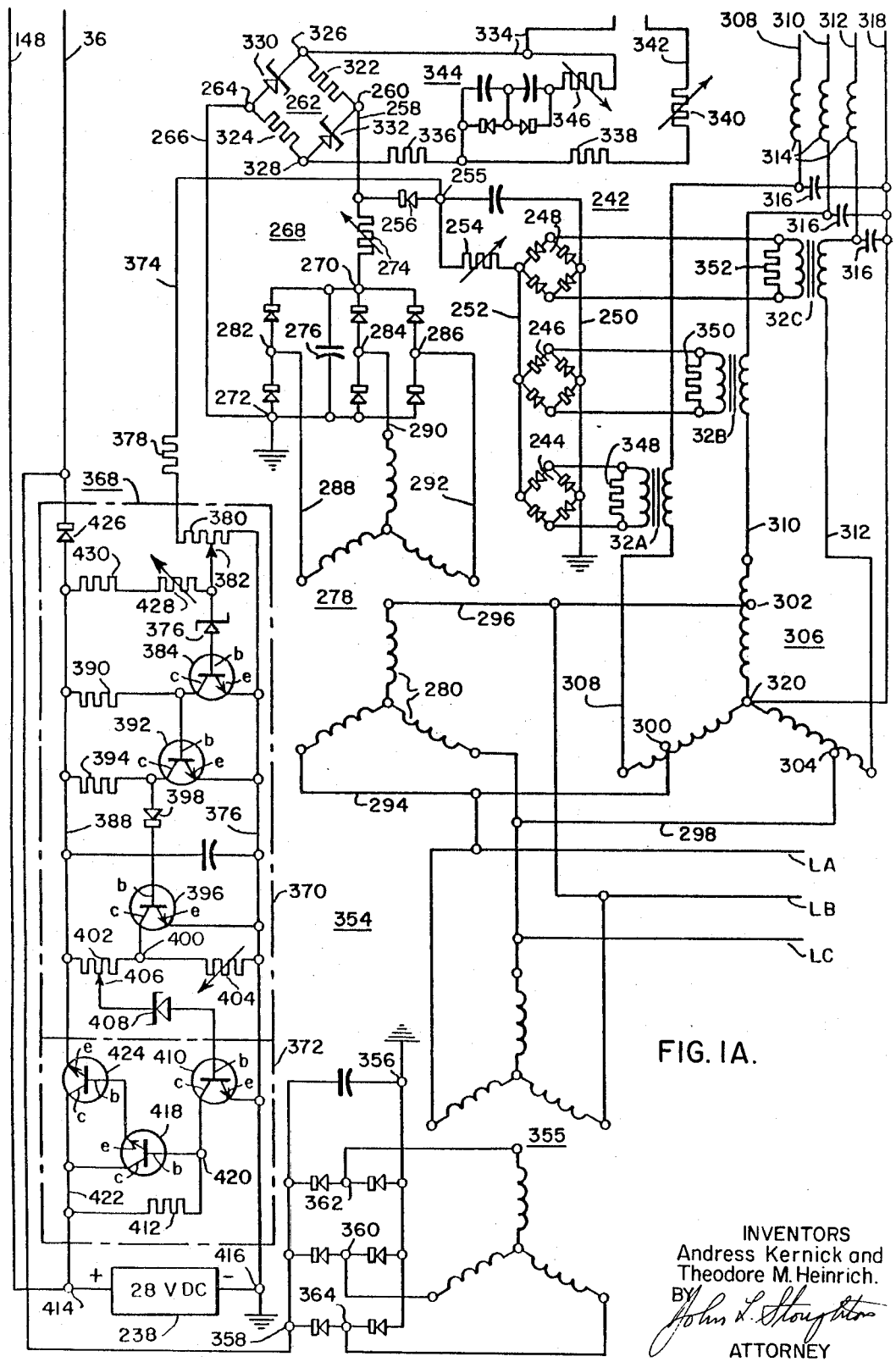
Figure 1B:
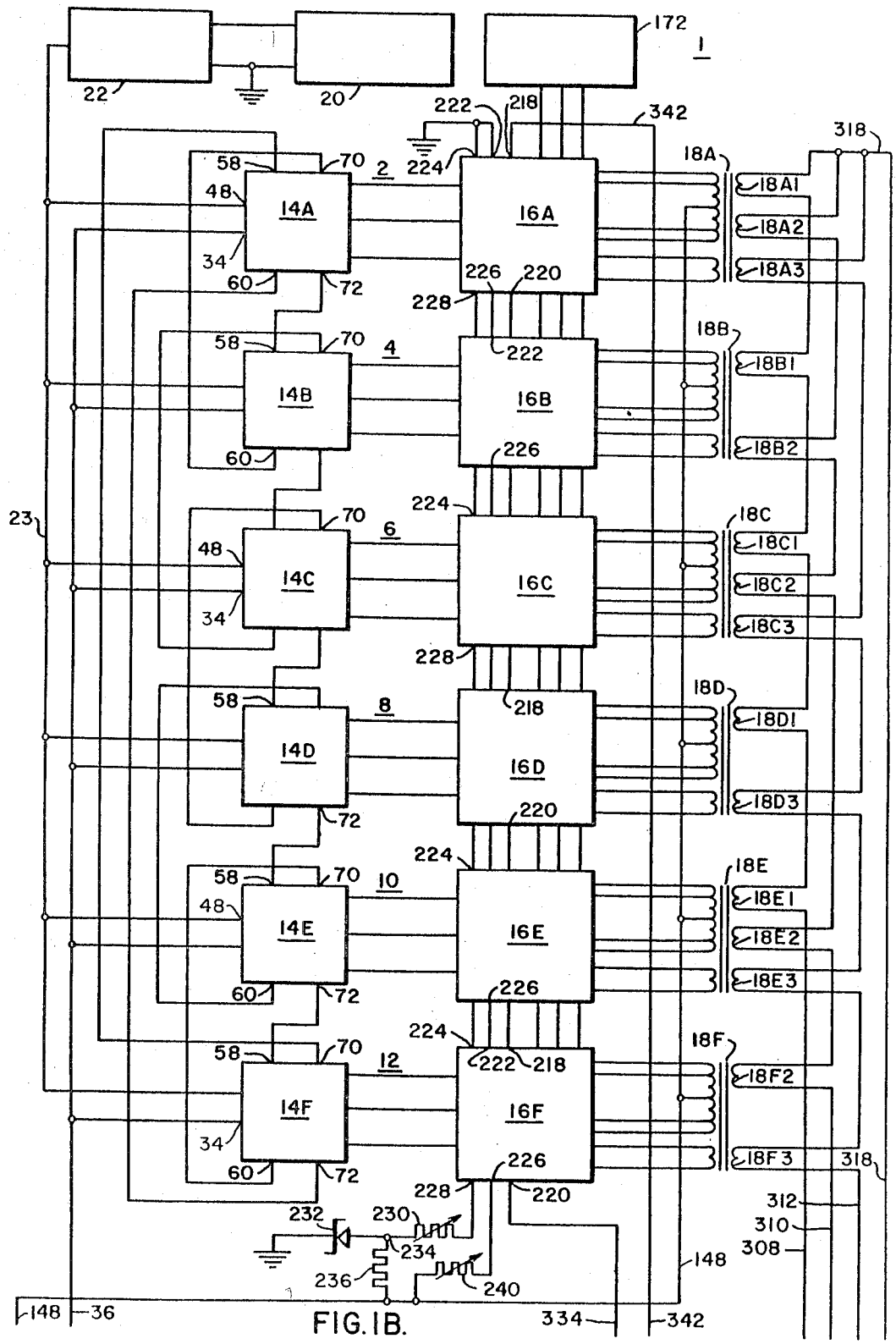

Referring to the drawings by characters of reference and to FIGS. 1A, 1B and 2, the numeral 1 designates generally a three-phase static inverter having six individual power stages 2, 4, 6, 8, 10, and 12 each comprising a flip-flop device 14, a driver 16, and an output transformer 18. For purposes of simplicity, the flip-flops of the power stages 2, 4, 6, 8, 10 and 12 are designated 14A, 14B, 14C, 14D, 14E, and 14F, respectively, and the drivers 16 and transformers 18 thereof are similarly designated with a corresponding suffix.

As is clearly shown in FIG. 1B, the flip-flops 14 are arranged for sequential operation and are driven by a constant frequency oscillator 20. The oscillator 20 is connected to each flip-flop 14A–14F through an amplifier 22 having an output conductor 23 connected to each of the various flip-flops 14. The flip-flops 14 are further interconnected such that only one thereof may be actuated at any one triggering impulse of the amplifier 22. As a consequence of the actuation of a one of the flip-flops 14, the control potential supplied thereby to the associated one of the drivers 16 will be reversed thereby causing the driver to reverse the output potential supplied by its associated output transformer 18.

As is more fully set forth in our copending application, Serial No. 117,966, filed June 19, 1961, one secondary winding 18A1, 18B1, 18C1, 18D1, and 18E1 of each of the transformers 18A, 18B, 18C, 18D, and 18E are series connected to provide one phase voltage of the output potential of the inverter 1. Similarly, one secondary winding 18A2, 18B2, 18C2, 18E2, and 18F2 of the transformers 18A, 18B, 18C, 18E, and 18F are series connected to provide a second output phase and windings 18A3, 18C3, 18D3, 18E3, and 18F3 of the transformers 18A, 18C, 18D, 18E, and 18F are series connected to provide a third output phase. When the magnitudes of the square waves generated by the transformer 18 are in accord with our said copending application, no harmonics below the 11th will be present and the phase of the three voltages will be displaced 120° from each other and will be at a frequency which is $\frac{1}{12}$ of the output frequency of the oscillator 20.

More specifically, the flip-flop 14 comprises an output transformer 24 having a center-tapped primary winding 26, tertiary control windings 28 and 30 and a center tapped secondary winding 32. The center tap of the primary winding is connected to the flip-flop power input terminal 34 and is connected to the ungrounded power supply bus 36. The end terminals of the winding 26 are connected to the collectors $c$ of the transistors 38 and 40, respectively, and the emitters $e$ are connected to a grounded power bus 42. The source of potential for operating the flip-flops 14 is derived from a power supply illustrated in FIG. 1A which will be more fully disclosed below. The tertiary winding 28 is connected between the base $b$ and emitter $e$ of the transistor 38 through a resistor 44 and is polarized with respect to the primary winding 26 such that when the transistor 38 conducts, the control signal applied between its base and emitter is in a direction to drive the transistor 38 into a conductive condition. Likewise, the tertiary winding 30 is connected between the base $b$ and emitter $e$ of the transistor 40 through a resistor 46 and is in a polarity to maintain a reverse control signal on the transistor 40 as a consequence of the conduction of the transistor 38. It will be appreciated that if transistor 40 conducts, the potential supplied by the winding 30 to the transistor 40 will tend to render this transistor 40 conductive and the signal supplied by the winding 28 acts to maintain the transistor 38 fully blocked.

In order to transfer conduction between the transistors 38 and 40, the flip-flop 14 is provided with an input signal terminal 48 which is connected to the signal output bus 23 of the amplifier 22. Each time that a negative signal is applied to the bus 23, the potential of the common connection 52 between the gates 54 and 56 is lowered considerably below ground potential. If a proper signal is applied to the one of the control terminals 58 or 60 of the gates 54 or 56 which is associated with the conducting one of the transistors 38 or 40, the conducting one thereof will be rendered non-conducting. When this occurs, the collapsing flux in the core of the transformer 24 will cause the one of the transistors 40 or 38 which was previously non-conductive to become conductive thereby reversing the flow of current through the primary winding 26 of the associated one of the transformers 24 and thereby the output potential of its secondary windings.

Each gate 54 and 56 comprises a capacitor 62 having one terminal thereof connected to the common connection 52 and the opposite terminal 64 thereof connected through a resistor 66 to its respective control terminals 58 or 60. Each gate further includes a rectifier 68 connected between terminal 64 and the base $b$ of the transistor 38 or 40 as the case may be. The rectifiers 68 are poled to conduct base drive current away from the base $b$. The flip-flops are each further provided with a pair of output signal terminals 70 and 72 which are coupled intermediate the collectors $c$ of the transistors 38 and 40 and the end terminals of the primary winding 26 to which they are connected. Upon conduction of the transistor 38, the potential of the signal terminal 70 will be substantially at ground potential while the potential of the signal terminal 72 will be at potential above ground equal substantially to twice that supplied to the input terminal 34 and vice versa when transistor 40 conducts.

In the sequence of operation of the flip-flops 14A–14F it is desired that the transistors 38 thereof be sequentially rendered conducting and thereafter the transistors 40. For this purpose the signal terminal 72 of flip-flop 14A is connected to the control terminal 58 of flip-flop 14B and the signal terminal 70 of 14A is connected to the control terminal 60 of 14B. The signal terminals 72 and 70 of 14B are similarly connected to the control terminals 58 and 60 of 14C and the flip-flops are likewise connected on down the series of flip-flops ending with the connection of flip-flop 14E to the flip-flop 14F. The flip-flop 14F is reconnected back to control the flip-flop 14A. However, it is desired that the flip-flop 14A be actuated to its opposite condition subsequent to operation of the flip-flop 14F. Therefore the signal terminals 70 and 72 of flip-flop 14A are connected respectively to the control terminals 58 and 60 of the flip-flop 14A which it will be appreciated is in a reverse manner from the other connections between the flip-flops.

The drivers 16 are each provided with a grounded power bus 80 which is connected with the cathodes $c$ of controled rectifiers 82 and 88. The anode $a$ of the controlled rectifier 82 is connected by means of a conductor 90 to the upper end terminal and anode $a$ of rectifier 88 is connected by conductor 96 to the lower end terminal of primary winding 91 of transformer 18. Likewise, the anodes $a$ of the controlled rectifiers 84 and 86 are connected by conductors 92 and 94 to intermediate taps 98 and 100 respectively of the winding 91. The cathodes $c$ of the controlled rectifiers 84 and 86 are connected to a "pass around" bus 101 to be described in greater detail below.

Signals for operation of the drivers are provided by the secondary windings of the transformers 24 of the flip-flops 14A–14F. The upper end terminal of the winding 32 is connected by means of conductor 102 and rectifier 104 to one terminal of a primary winding 106 of a saturating transformer or magnetic amplifier 108 having a saturable core 110. The other terminal of the winding 106 is connected to a connection 112 and therefrom to the lower end terminal of the winding 32 through a resistor 114, a rectifier 116 and a conductor 118. The lower end of the terminal of the winding 32 is connected to one terminal of winding 124 of a saturating transformer of magnetic amplifier 126 having a saturating core 128 through the conductor 118 and a rectifier 122. The other terminal of the winding 124 is connected through a connection 130, a resistor 132, and a rectifier 134 and the bus 102 to the upper output terminal of the winding 32. The transformer 108 is provided with a secondary winding 136 which is connected between the gate $g$ and cathode $c$ of the controlled rectifier 82 through a resistor 138 and a rectifier 140. Likewise, transformer 126 is provided with a secondary winding 142 connected between the gate $g$ and the cathode $c$ of the controlled rectifier 88 through a resistor 144 and a rectifier 146.

During the intervals that the transistor 38 conducts, the potential of the upper terminal of the winding 32 will be positive and current will flow therefrom through the conductor 102, rectifier 104, winding 106, resistor 114, rectifier 116, and conductor 118 to the lower terminal of the winding 32. The center tap of the winding 32 is connected by a conductor 145, a rectifier 147, and conductor 149 to the lower and upper end terminals respectively of the primary windings 151 and 152 of saturating core transformers 153 and 154. The lower and upper terminals of the windings 151 and 152 are connected through resistor 155–156 and 157–158 respectively to connections 130 and 112 respectively. Prior to saturation of the core 110, the winding 106 will sustain voltage and the connection through 145, 147, 149 and winding 152 will maintain a resetting current flow through the winding 152. Also during saturating time of the core 110, a voltage will be induced in the winding 136 of a polarity to make the gate $g$ of the controlled rectifier positive with respect to its cathode $c$ to render the controlled rectifier 82 conductive. With rectifier 82 conducting current flows from the positive power bus 148, which is connected to the center tap 150 of the power output transformer 18, through the upper half of the winding 91, the controlled rectifier 82, bus 80, and ground back to the other side of the power supply. For purposes of discussion this energization of winding 91 will be referred to as the positive half cycle. The secondary windings associated with the transformer 18 will be energized to supply an output potential of a polarity as indicated by the dots which are conventionally used to indicate the terminals of the windings having like instant polarity. The time required to saturate the cores 110 and 128 is equal to the pulse interval that the transformer 18 is to be energized. When the core 110 saturates, the voltage induced in the winding 136 drops below a useful value and a conducting potential is no longer supplied to the gate $g$. In this regard it is well to note that the gating potential is required only to start conduction and may thereafter be removed without interrupting the flow of current therethrough. The reason for maintaining the gating potential throughout the conducting period is to permit the use of the inverter with loads of any power factor. Upon saturation of the core 110, the winding 106 no longer maintains a potential thereacross and the potential of the connection 112 is raised to substantially that of the upper terminal of the winding 32. When this occurs, current will flow in the forward direction through the primary winding 152 of the saturable transformer 154, resistor 157, resistor 132, resistor 156, rectifier 116 and conductor 118 back to the winding 32. When this occurs, voltages of the polarity indicated by the dots will be induced in the secondary windings 162, 164 which link the core 160. The winding 162 is connected between the gate g and the cathode c of controlled rectifier 84 through a resistance 165, and is poled such that the gate g is positive with respect to the cathode c whereby the controlled rectifier 84 is rendered conductive. The winding 164 is connected between a pair of control conductors 167 and 168 through a rectifier 169. These conductors control the conductivity of a pair of transistors 170 and 171 in a "passed-around" turn off apparatus 172. The conductors 167 and 168 are connected between the base b and emitter e of a pilot transistor 171 which has its collector c and emitter e connected in series across a source of control potential 173, diagrammatically illustrated as being a battery but which may be any source. Energization of the winding 164 causes current to flow base to emitter in transistor 171 to render it conductive to pass base current from the source 173 to render transistor 170 conductive. The emitter e of transistor 170 is connected to ground while its collector c is connected to the pass around bus 101. Concurrently with rendering of the controlled rectifier 84 conductive, transistors 170 and 171 are also rendered conducting by the signal developed in the winding 164 and a shunting circuit is established to ground around the controlled rectifier 82. This circuit extends from the terminal 98 and includes a portion of the winding 91 so that the potential to ground through the shunting circuit is greater than through the normal power circuit which includes the rectifier 82. This results in the lowering of the current through the rectifier 82 below the sustaining current valve and rectifier 82 becomes non-conductive. The core 160 saturates shortly after the rectifier 82 becomes non-conductive thereby removing the drive current from the transistor 171 which results in a reduction in the current through the transistor 171 and in the controlled rectifier 84 and the rectifier 84 becomes non-conductive.

At the time the core 160 saturates the potential of the conductor 149 rose to substantially that of the conductor 102. This causes a reversal of the voltage across the rectifier 147 and a turn-on voltage for rendering the shorting network 174 effective to short the winding 176 of the power transformer 18 whereby the impedance thereof in the output conductors is substantially reduced beyond what would normally occur when the primary winding 91 is not energized from the source of potential. For this purpose the end terminals of the winding 176 are connected to the input terminals 177 of the shorting network 174 which includes a rectifier bridge 178 controlled by means of cascaded transistors 179 and 180 connected between the control terminals 181 of the bridge 178. Conduction of the transistor 179 is controlled by the transistor 180, the base b of which is connected to the end of the rectifier 147 which is connected to the conductor 149 and the emitter e of which is connected through a biasing resistor 182 to the other end of the rectifier 147. While the shorting network 174 is illustrated as being connected to a separate winding 176, it may if desired be connected to short any of the transformer windings.

Subsequent to the termination of conduction through the controlled rectifier 84, the flip-flop of this power stage will be actuated by the oscillator to reverse the conducting condition of its transistors 38 and 40 to reverse the output polarity of its transformer 24. When this occurs, current flows from the lower end terminal of winding 32 through conductor 118, rectifier 122, winding 124, connection 130, resistor 132, rectifier 134, and conductor 102 to the upper end terminal of winding 32. Due to the unsaturated condition of the core 128, a substantial portion of the voltage developed in the winding 32 will appear across the winding 124. Also the change in polarity of the winding 32 will cause a reversal in potential across the rectifier 147 so that current flows in a forward direction therethrough between the center tap and upper end terminal of the winding 32 through resistor 157 and through winding 151 of transformer 153 and resistor 132. This current flow through winding 151 resets the flux in the core 184 of transformer 153 and also ensures that the controlled rectifier 86 and transistors 170 and 171 will not be rendered conductive in the same manner as the flux was reset in transformer 154 and rectifier 82 was held non-conductive during the initial portion of the positive half cycle of transformer 32. The reversal in polarity across the rectifier 147 rendered the transistors 179 and 180 nonductive to open the shorting network 174.

During the interval before saturation of the core 128, negative pulse interval, the changing flux in the core 128 will induce a potential in the secondary winding 142 which renders the controlled rectifier 88 conducting to initiate the negative half cycle of the output voltage wave of the transformer 18.

The transformer 153 is provided with a saturable core 184 which links its primary winding 151 with its secondary windings 186 and 188. The winding 188 corresponds to the winding 164 of the transformer 154 and is similarly connected to the control conductors 167 and 168. Winding 186 corresponds to the winding 162 and is connected across the gate g and cathode c of the controlled rectifier 86. The winding 151 is connected between the conductor 149 and the connection 130 and is energized subsequent to the saturating of the core 128 of transformer 126 to fire the "passed around" turn-off apparatus 172 and rectifier 86 to extinguish the power rectifier 88 and terminate the negative half cycle of the output voltage of the transformer 18 in the same manner as described above.

From an inspection of FIG. 1B it will be apparent that the "passed-around" turn-off apparatus is, as the name infers, passed around among the drivers 16A–16F so that it in turn extinguishes the power and auxiliary controlled rectifiers 82, 84, 86, and 88 of each driver 16A–16F. This is possible because of the sequential nature of the operation of the power stages by the oscillator 20 which requires a switching action in only one stage at a time. In this regard it may be well to note that any reactive or other current which may flow subsequent to the action of the "passed-around" apparatus is permitted to flow due to the shorting action of the shorting network 174 which reduces to a minimum the impedance afforded by the associated transformer.

The saturable transformer 108 and 126 are provided with control windings 212, 214 and 216 which control the initial flux in both of the cores 110 and 128. The winding 212 is connected between an input terminal 218 and an output terminal 220. Likewise, the windings 214 and 216 are connected from the input terminals 222 and 224 to the output terminals 226 and 228. All of the windings 212 of the drivers 16 are connected in series as are also all of the windings 214 and all of the windings 216.

The circuit including the windings 216 of the various drivers 16 is provided with an adjustable but constant current therethrough and for this purpose the terminal 224 of the driver 16A is connected to ground and the terminal 228 of the driver 16F is connected through a variable resistor 230 and a Zener diode 232 to ground. The common point 234 between the Zener diode 232 and the variable resistor 230 is connected through another resistor 236 to the potential supply bus 148 which is maintained at a positive potential with respect to ground by a suitable source of direct current energy 238 (FIG. 1A). In the practice of this invention applicants have used a potential of 28 volts but other voltages, depending upon the particular controlled rectifiers utilized, may be used if desired. With this arrangement, the potential of the common point 234 is maintained at a substantially constant potential with respect to ground and a constant current, of a magnitude determined by the adjustment of the variable resistor 230, will flow through the coils or windings 216 of all of the drivers 16 to aid in the establishment of an initial flux therein and thereby the saturating time of their cores.

The windings 214 provide compensation for compensating for any changes in the output voltage of the direct current source 238. The terminal 222 of the driver 16A is connected to ground while the terminal 226 of the driver 16F is connected through a variable resistor 240 to the direct current potential supply bus 148. With this arrangement, a current proportional to the voltage of the source 238 flows through the various windings 214 and regulates the residual magnitude of the flux in the cores 110 and 128 to increase or decrease the saturating time thereof to compensate for potential variations of the source 238.

The remaining circuit which includes the windings 212, provides for reducing the output potential of the transformers 18 if the output current and/or voltage of the polyphase inverter 1 exceeds predetermined magnitudes. The voltage signal for controlling the windings 212 is the greater voltage signal of a voltage derived as a function of the output current or of a voltage which is a function of the output voltage. The voltage signal proportional to output current is derived from a plurality of current transformer 32A, 32B, and 32C located in the output conductors 308, 310, and 312. The output of these current transformers is supplied to a rectifier network 242 which functions to supply an output voltage proportional to the larger of the currents in the lines LA, LB and LC.

The network 242 comprises a plurality of bridge-type rectifiers 244, 246 and 248 which are energized by the current transformers 32A, 32B and 32C. The direct current output terminals of these rectifiers are connected in parallel between a grounded bus 250 and an ungrounded bus 252. The bus 252 is connected through a variable resistor 254, terminal 255, a rectifier 256 and a bus 258 to one input terminal 260 of an error signal bridge 262, the other input terminal 264 of which is connected to a grounded bus 266 and thereby to the grounded bus 250. A filter capacitor may be connected between bus 250 and the common point between the resistor 254 and rectifier 256, if desired.

The signal which is a function of the output voltage of the inverter 1 is derived from a full wave rectifier bridge 268 of usual construction, having a positive potential output terminal 270 and a negative potential output terminal 272 connected to the ground bus 266. The positive potential terminal 270 is connected to the input terminal 260 of the signal bridge 262 through a variable resistor 274 and the bus 258. If desired a filter capacitor 276 may be connected between the output terminals 272 and 270.

A three-phase Y connected transformer array 278 has its secondary windings 280 connected in Y and to the input terminals 282, 284 and 286 of the rectifier network 268 by means of conductors 288, 290 and 292. The primary windings 280 of array 278 are connected by means of conductors 294, 296 and 298 to terminals 300, 302, and 304 of a three-phase autotransformer 306 which interconnects the output buses or lines LA, LB or LC respectively to the conductors 308, 310 and 312 which contain the current transformers 32A, 32B and 32C and inductors 314 between which extend smoothing capacitors 316.

The error signal bridge 262 comprises a pair of resistors 322, 324 which are respectively connected between the input terminal 260 and an output terminal 326 and input terminal 264 and an output terminal 328. Zener diodes 330 and 332 are respectively connected between the terminals 326 and 264 and between the terminals 328 and 260.

The control voltage applied between the terminals 264 and 260 by rectifier 268 at the normal value of output voltage at the lines LA, LB and LC is twice the breakover value of the Zener diode 330 and 332. Under these conditions, the voltage drop across each of the resistors 322 and 324 will be equal and is the same as the voltage drop across each of the Zener diodes 330 and 332. Under these conditions the bridge 262 is balanced and there is no potential difference between the bridge output terminals 326 and 328. An increase or decrease in the potential applied across the terminals 260 and 264, resulting from an increase or decrease in line potential or line current, will unbalance the bridge 262. An increase in line potential unbalances the bridge to provide a current flow through the windings 212 in a direction to decrease the saturating time of the transformers 108 and 126 and of a magnitude dependent upon the magnitude of the unbalanced. This decrease in saturating time reduces the time that the transformer 18 is energized to reduce the output line voltage. The reverse effect would occur as a consequence of a decrease in line potential to increase the saturating time of the transformers 108 and 126.

Overcurrent protection is provided by a voltage signal applied to the bridge 262 from the rectifier network 242 and may be arranged to limit the line current so that even if the lines LA, LB and LC are shorted, the current will not exceed a predetermined desired magnitude which might cause destruction of the apparatus prior to opening of the normal circuit breaker (not shown).

The output terminal 326 of the bridge 262 is connected by means of a conductor 334 to the terminal 220 of the driver 16F, the output terminal 328 of the bridge 262 is connected through fixed resistors 336 and 338 and a variable resistor 340 to a conductor 342 which connects with terminal 218 of the driver 16A. A filter network 344 is connected between the conductor 334 and the common point of the resistors 336 and 338. This network includes a variable resistor 346. The settings of the variable resistors 340 and 346 are determined by stability considerations. The settings of the adjustable resistor 340 establishes the rate of decrease or collapse of output voltage which increase of overcurrent. Resistors 348, 350 and 352 which are shunt connected respectively with the secondary windings of the current transformers 32A, 32B, and 32C determine the critical value of overcurrent at which the overcurrent protection circuit begins operating.

The power for operating the flip-flop networks 14A–14F at output current values below a predetermined magnitude is derived from a rectifier network 354 energized from lines LA, LB, and LC through a transformer 355. The network 354 is provided with positive and negative output terminals 356 and 358, respectively and alternating current input terminals 360, 362 and 364 to which the transformer 355 is connected. The negative output terminal 356 is connected to ground and therethrough to the grounded buses 42 of the flip-flop networks 14A–14F. The positive output terminal 358 is connected to the input terminals 34 of each of the flip-flop networks 14A–14F through the positive potential supply bus 36. This arrangement provides a low-loss regulated source of potential for efficiently energizing the flip-flop networks 14 when they are driving the control drivers 16A–16F at current values below a predetermined value.

At operating conditions of the inverter 1, at output current values greater than the said predetermined value, it is desirable to drive the transistors 38 and 40 with a current of a higher value to supply an increased drive voltage to the drivers 16A–16F. This increase voltage to the flip-flops 14A–14F is provided by a network 368 energized directly from the 28-volt direct current source 238. This network 368 comprises a signal amplifier 370 and a voltage regulator 372. The amplifier 370 is actuated by the output current signal established by the rectifier network 242 and transmitted thereto through a conductor 374 which connects the terminal 255 to a grounded bus 376 through a pair of series connected resistors 378 and 380. The resistor 380 may take the form of a conventional potentiometer and is provided with an arm 382 or other intermediate tap, the potential of which with respect to ground bus 376 will be a function of a magnitude of the potential of the conductor 374 which is proportional to the overcurrent in one of the lines LA, LB and LC which transmits the greatest current.

The potential difference between the arm 382 and the grounded bus 376 is applied between the base and emitter of the first transistor 384 of the amplifier 370 through a Zener diode 376. When this potential reaches the breakover potential of the diode 376 (which is the predetermined current magnitude of the full load current in the lines LA, LB or LC which requires an increase drive to be applied to the drivers 16A-16F), the diode 376 conducts to render the transistor 384 conductive. The main or emitter-collector circuit of transistor 384 is connected between a positive potential bus 388 and the ground bus 376 through a biasing resistor 390. When transistor 384 conducts, the drop across resistor 390 lowers the potential, of the base electrode b (which is connected intermediate the collector c of transistor 384 and resistor 390) of an amplifying transistor 392, from substantially the potential of the bus 388 to substantially the potential of the bus 376. Since the emitter of transistor 392 is directly connected to the bus 376, this reduction in drive signal causes the previously conducting transistor 392 to cease conducting. The collector c of this transistor 392 is connected through a resistor 394 to bus 388 so that the potential of the collector c of the transistor 392 which was previously substantially at ground potential now increases to substantially that of the bus 388.

Another amplifying transistor 396 has its base b connected through a rectifier 398 to a common point between the collector c of the transistor 392 and resistor 394, its emitter e is connected to bus 376, and its collector c connected to a terminal 400 common to a pair of series connected resistances 402 and 404. The free end of resistor 402 is connected to bus 388 and the free end of the variable resistor 404 is connected to the grounded bus 376. Rendering of the transistor 392 into a non-conducting condition causes a base drive current to flow in the non-conducting transistor 396 which thereupon conducts. When conductive, the transistor 396 shunts the resistor 404 whereby substantially the entire potential between the buses 388 and 376 appears across the resistor 402.

When this occurs, the ratio between the potential of the slider 406 and the bus 376 is reduced. Since the Zener diode 408 attempts to maintain a constant voltage drop thereacross, the current flow will decrease and endeavor to establish the initial potential difference between the slider 406 and the bus 388. This reduction in the current flow through the Zener diode 408 which is connected between the slider 406 and the bus 376 through the base b and emitter e of a modulating transistor 410 of the voltage regulator 372 reduces the flow of current therethrough and a bias resistor 412 connected in series between the positive potential bus 422 (connected to the positive terminal of source 238) and the collector c of the transistor 410.

With the transistor 396 non-conducting, the resistor 404 is adjusted to provide for a predetermined current flow through the Zener diode 408. This predetermined current maintains the transistor 410 in a first conductive position to maintain second and third transistors 418 and 424 of the regulator 370 in a first conducting state. When so controlled, the transistors 418 and 424 will maintain a potential difference between the buses 388 and 376 less than the potential established between the terminals 356 and 358 of the network 354.

More specifically, the base b of the transistor 418 is connected to the common point 420 between the collector c of transistor 410 and the resistor 412. Its collector c is connected to the bus 422 and its emitter e is connected to the base b of transistor 424. The collector c of transistor 424 is connected to the bus 422 while the emitter e thereof is connected to bus 388. With the transistor 396 non-conducting, a greater current flow through the Zener diode 408 is required to maintain a predetermined potential difference between the slider 406 and bus 376 than when the resistor 404 is effectively shorted due to conduction of the transistor 396. This lesser current flow through the diode 408 reduces the conductivity of the transistor 410 and the current through the resistor 412. This current reduction through the resistor 412 raises the potential of the base b of the transistor 418 and its base drive current is increased. This increase in the base drive current increases the conductivity of the transistor 418 which increases the base drive current for transistor 424 to increase its conductivity to decrease the drop between its emitter and collector to raise the potential of the bus 388. As the potential of the bus 388 increases, more current will flow through the Zener diode 408 thereby increasing the conductivity of the transistor 410 and the potential drop across the resistor 412. This limits the conduction of the transistor 424 so that the potential of the bus 388 is stabilized at an increased potential as determined by the position of the slider 406 of the resistor 402. If, as suggested, the potential supplied by the network 354 is 15 volts, the increased stabilized potential between conductors 388 and 376 may be 20 volts. The bus 388 is connected to bus 36 through a rectifier 426 which prevents current flow to the bus 388 when the potential thereof is below 15 volts and permit flow from the bus 388 to bus 34 when the potential of bus 388 is at its increased stabilized potential of 20 volts.

In order that the network 368 is operated between its 20 volts output and a voltage below that of the output of rectifier 354, a pair of resistors 428 and 430 are connected in series between the bus 388 and the arm 382 of the potentiometer 380. When the network 368 is initially actuated by an increase in potential in the conductor 374, the potential of the bus 388 raises the potential of the arm 382 somewhat above the potential to which it was raised as a consequence of the increase potential of the conductor 374. This added increase in potential ensures the continued conduction of the Zener diode 376 and the transistor 384 even though a small reduction in the potential of the conductor 374 should subsequently occur.

The output voltages supplied to the error bridge 262 by the rectifier 242 is so related to that supplied by the rectifier 268, that at current values in the lines LA, LB and LC of 200% or less of the rated line current and at rated voltage, the voltage supplied by the rectifier 268 is equal to or greater than that supplied by any of the rectifiers 244, 246 and 248. At currents greater than 200% of the rated current, the voltage supplied to the bridge 262 by rectifier 242 becomes greater than the current flow through the various windings 212 changes to reduce the conducting time of the controlled rectifiers 82 and 88 thereby reducing the output voltage of the inverter 1. The magnitude of the resistance of the resistors 348, 350, and 352 are so related to the turns ratio of the transformers 32A, 32B, and 32C that the current through the error bridge will increase sufficiently to prevent current flow of more than 300% of rated current even though line conductors LA, LB and/or LC are shorted together.

It will be appreciated that the output phase potential will consist of stepped voltage waves which approach a sine wave formation in a manner more fully illustrated, described and claimed in our said copending application. This application differs from the said copending application in that the control valves utilized therein are of the discontinuous control type and must be rendered non-conductive by control means external thereto.

Figure 3A:
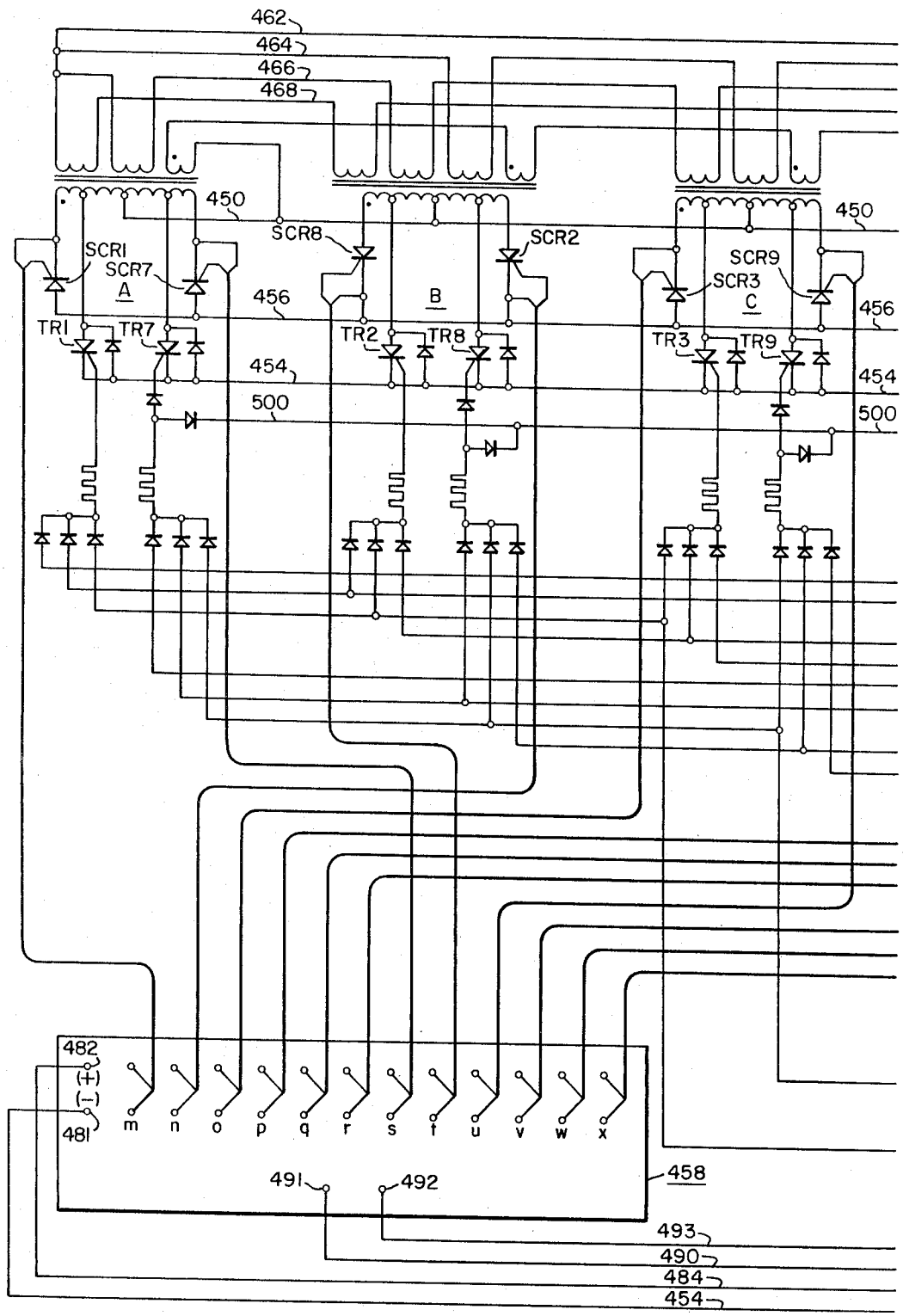
Figure 3B:
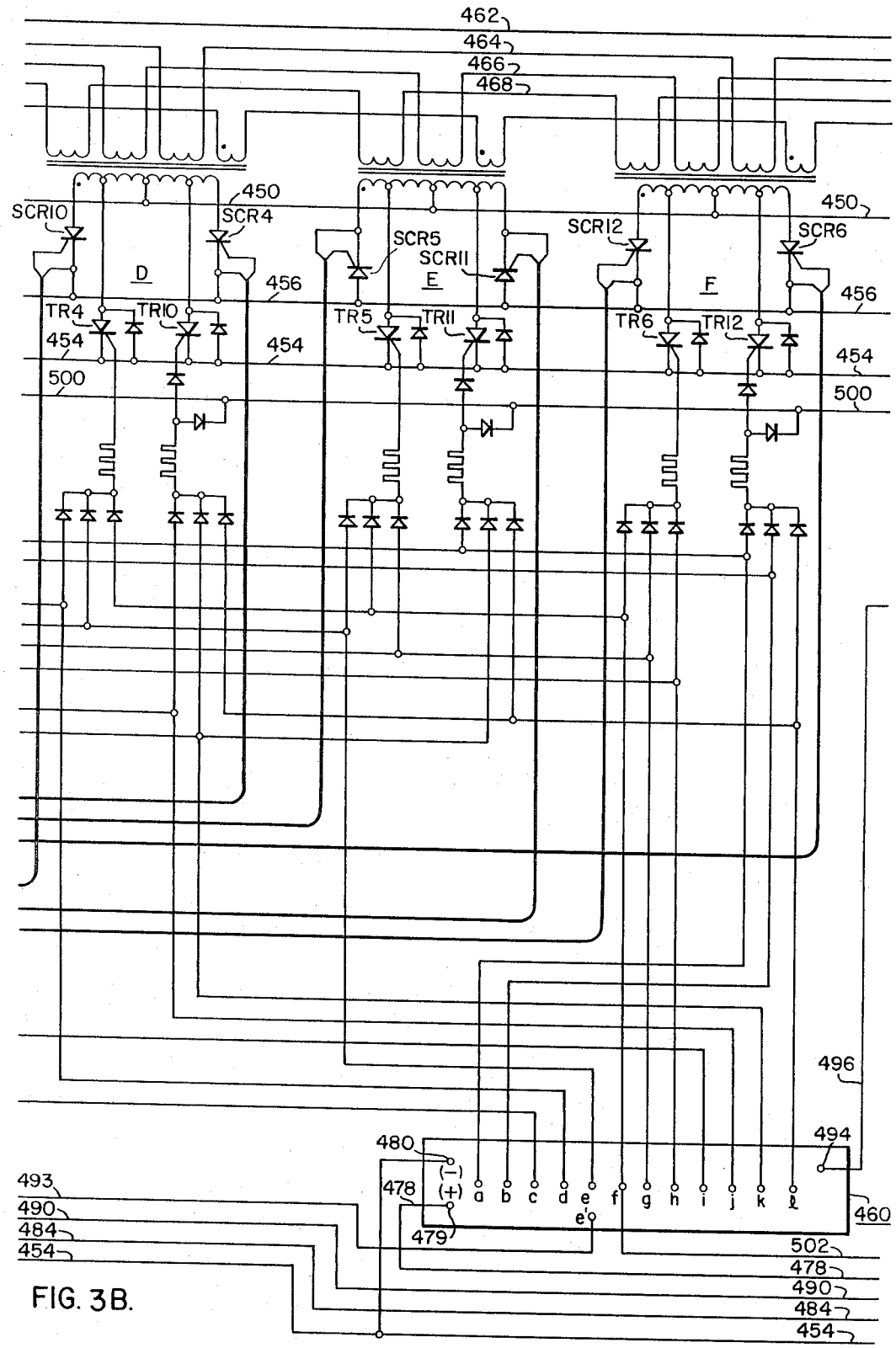
Figure 3C:
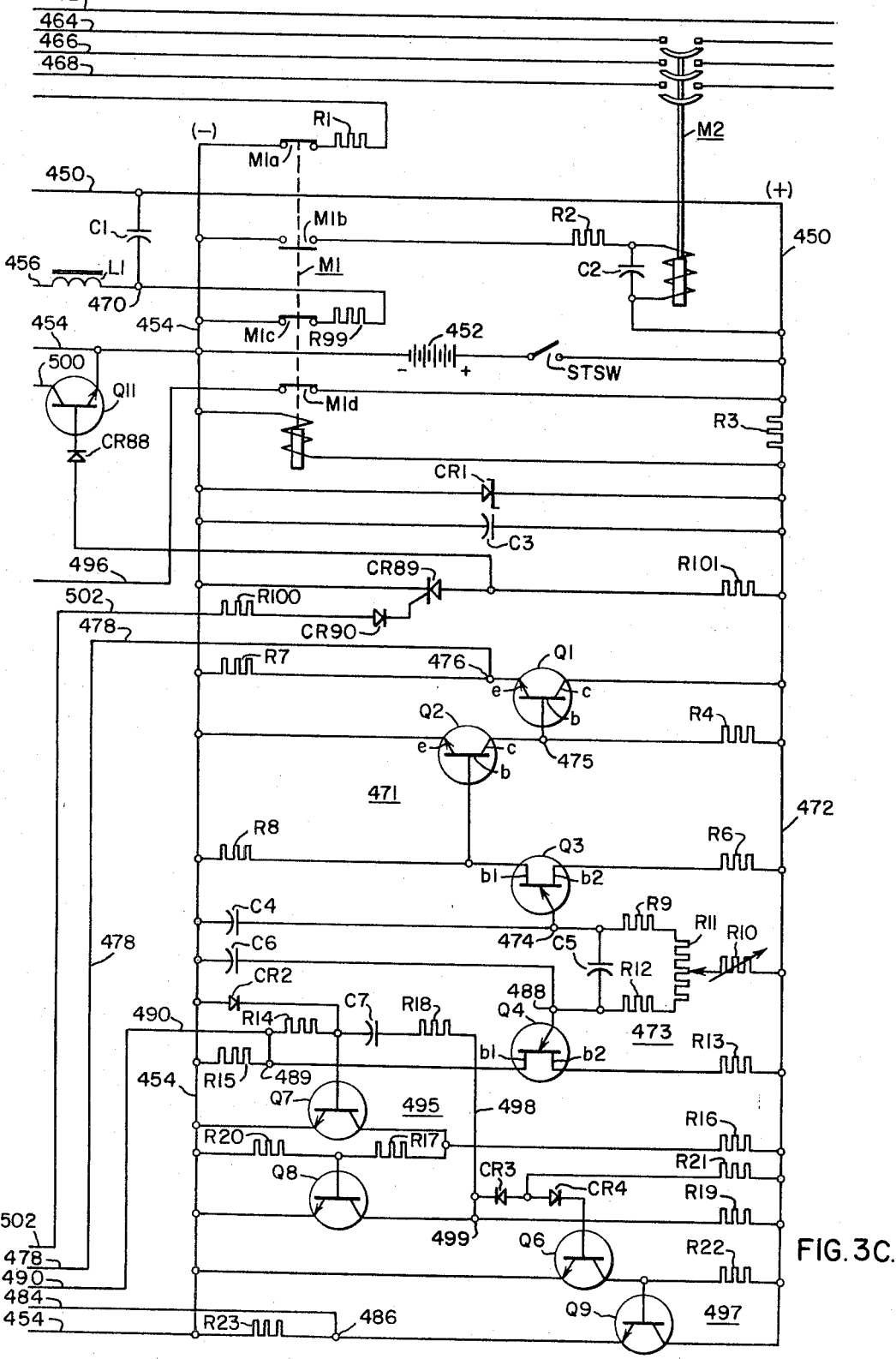

The inverter illustrated in FIGS. 3A, 3B and 3C comprises a plurality of power stages A, B, C, D, E and F. Each of these stages comprises a transformer having a tapped primary winding and a plurality of secondary windings. The center tap connection of each of the primary windings of the transformers are connected to a positive bus 450 which is connected to the positive terminal of a suitable source of direct current supply illustrated as being a battery 452. The intermediate terminals of the primary windings on either side of the center terminal are connected through controlled rectifiers TR1–TR12, to a negative bus 454 which is connected to the negative terminal of the battery 452. The end terminals of these primary windings are connected to a common bus 456 through controlled rectifiers SCR1–SCR12. The controlled rectifiers SCR1, SCR3, SCR5, SCR7, SCR9 and SCR11 are polarized to conduct current from the common bus 456 to the transformer winding while the controlled rectifiers SCR2, SCR4, SCR6, SCR8, SCR10 and SCR12, conduct current in a direction from the transformer windings to the common bus 456. This is for a purpose which will be made clear below.

Figure 4:
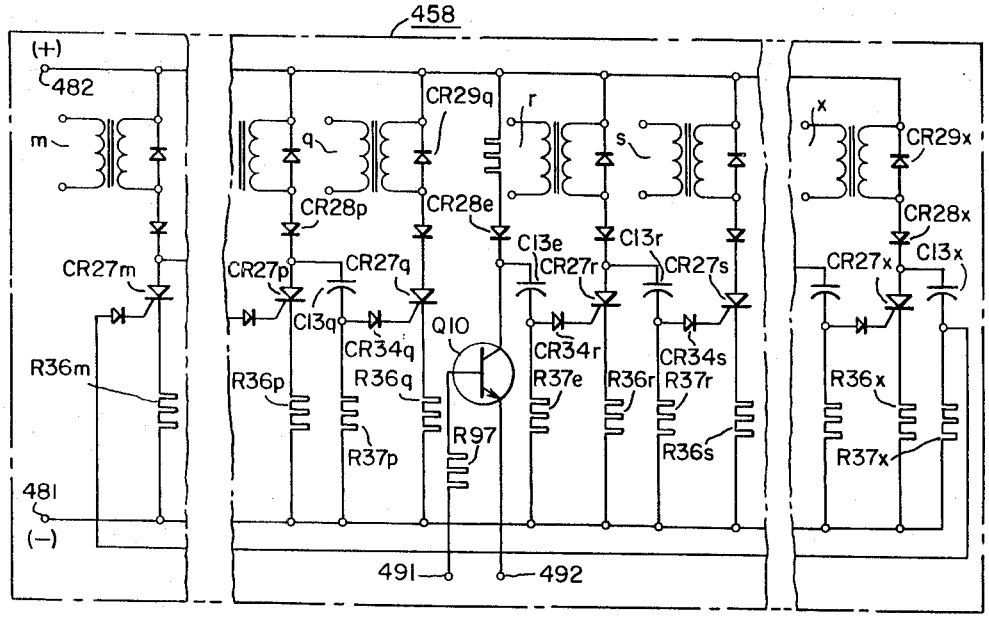
FIG. 4 is a schematic diagram of the ring counter of FIG. 3A.
Figure 5:
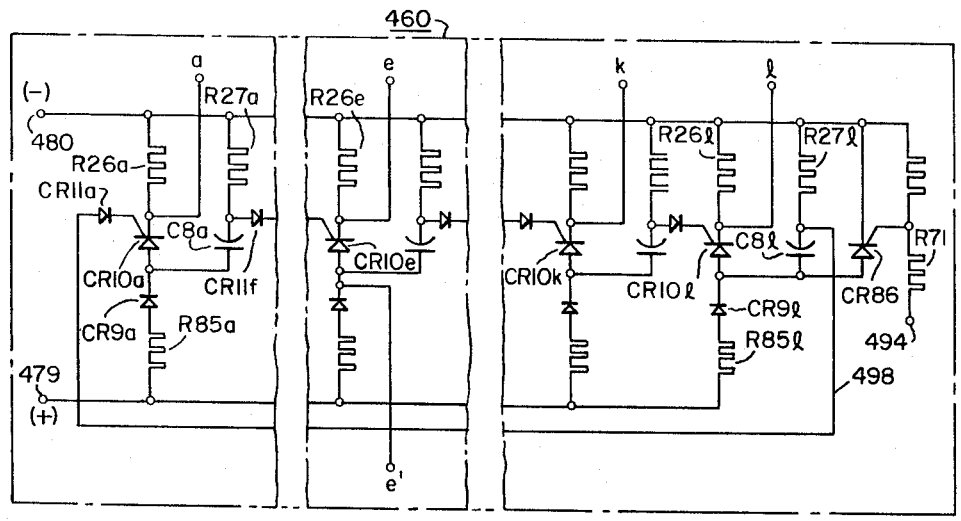
FIG. 5 is a schematic diagram of the ring counter of FIG. 3B.

The gates of the controlled rectifiers SCR1–SCR12 are respectively connected to the output circuits $m, n, o, p, q, r, s, t, u, v, w$, and $x$ of the ring counter 458 while the gate circuits of the controlled rectifiers TR1–TR12 are connected respectively to the output circuits $a, b, c, d, e, f, g, h, i, j, k$ and $l$ of the ring counter 460. The ring counters 458 and 460, portions of which are shown in detail in FIGS. 4 and 5, are of the type shown and claimed in a copending application of Paul F. Kueber, Serial No. 302,915, filed August 19, 1963, and assigned to the same assignee as is this application.

The power transformers associated with the power stages A through F are provided with secondary windings comparable to the secondary windings of the transformers 18A through 18F as illustrated in FIG. 1B and are connected as described above to energize a three phase output circuit. A suitable contactor or breaker M2 is utilized to connect the inverter at a controlled time. Additionally, these power transformers are provided with a set of flux setting windings which are connected in series with each other between the positive bus 450 and the negative bus 454 through the contacts M1a of a control relay M1. Resistor R1, connected in series in this circuit, limits the current flow therethrough upon saturation of the transformer cores.

Figure 6:
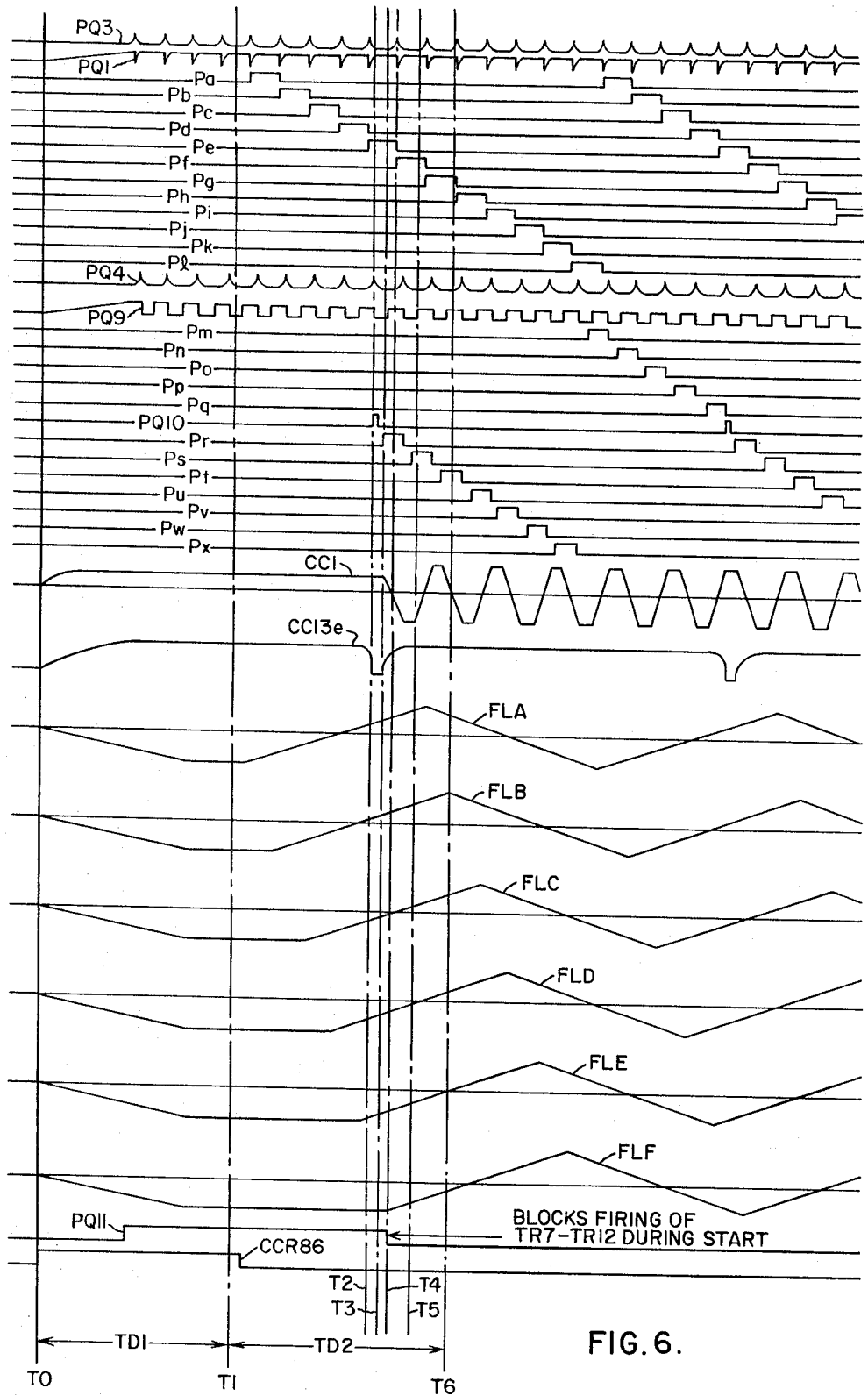
FIG. 6 is a time chart of certain of the operating sequences.

As indicated by the usual dots, these flux setting windings are polarized so that current flow therethrough will saturate the cores of the transformers A through F in the same direction, see curves FLA–FLF of FIG. 6. The result of the setting of the flux and the open condition of the breaker M2 insure that none of the transformers will become saturated upon the "start-up" of the inverter. This eliminates the danger of damage to the controlled rectifiers due to excess current flow therethrough.

The turn-off or shut-off device comprises a capacitor C1 and an inductance L1 connected in series between the positive bus 450 and the common bus 456. These buses are sequentially connected to the transformers of the power stages A–F under control of the ring counter 458. The common terminal 470 of the capacitor C1 and inductance L1 is connected through a resistor R99 and contacts M1c of the relay M1 to the negative bus 454 to provide an initial charge on the capacitor C1 and "start-up" of an inverter.

The ring counters 458 and 460 are driven by a pair of unijunction relaxation oscillators 471 and 473. These oscillators have supply output pulses PQ3 and PQ4 at a frequency 12 times the desired output frequency of the inverter. The pulses PQ3 are phase displaced with respect to the pulses PQ4 as shown. The unijunction oscillators are connected between the negative bus 454 and a constant potential positive bus 472 which is connected to the positive bus 450 through a resistor R3. A Zener diode CR1 is connected between the buses 454 and 472 and maintains a voltage dropping current flow through the resistor R3 sufficient to provide the constant potential difference between the buses 454 and 472. A capacitor C3 is connected in shut with the Zener diode CR1 to smooth out ripples. During "start-up," the resistor R3 and capacitor C3 have current limiting and timing functions which will be brought out more fully below.

The first relaxation oscillator 471 includes a unijunction transistor Q3 which has its first and second bases $b2$ and $b1$ connected to the buses 472 and 454 through resistors R6 and R8 respectively. The emitter of the unijunction transistor Q3 is connected to a common terminal 474 between a capacitor C4 and a resistor R9 connected in series between the buses 454 and 472; the capacitor C4 being connected to the negative bus 454 and the resistor R9 being connected to the positive bus 472 through a resistor R10 and a portion of a potentiometer resistor R11 as determined by its movable contact.

The base $b1$ of the unijunction transistor Q3 is connected to the base $b$ of a transistor Q2, the collector $c$ which is connected to the positive bus 472 through a resistor R4 and to the base of a transistor Q1. The emitter of the transistor Q2 is connected to the negative bus 454.

The base of transistor Q1 is connected to the common terminal 475 of the collector of the transistor Q2 and the resistor R4. The collector of transistor Q1 is connected to the positive bus 472 and the emitter $e$ is connected through a resistor R7 to the negative bus 454. The potential of an output terminal 476, which is at the common connection of the resistor R7 and emitter $e$ of the transistor Q1, is altered in magnitude from a magnitude which is substantially that of the negative bus 454 to a magnitude which is substantially that of the positive bus 472 as a consequence of the transistor Q1 being rendered non-conducting and conducting respectively (see curve QP1).

A shift bus 478 connects the output terminal 476 to the positive potential terminal 479 of the ring counter 460 whereby the ring counter is pulsatingly energized to shift the conducting one of the controller rectifiers CR10a–CR10e each time that the potential of the terminal 476 is reduced to substantially that of the negative bus 454 and again raised to substantially that of the positive bus 472.

The negative potential terminals 480 of the ring counter 460 and 481 of the ring counter 458 are connected directly to the negative bus 454. The positive terminal 482 of the ring counter 458 is connected by conductor 484 to the output terminal 486 of the one-shot multivibrator which is driven by the second unijunction relaxation oscillator 473.

The second unijunction relaxation oscillator 473 comprises a unijunction transistor Q4 having its base $b2$ connected to the positive bus 472 through the resistor R13 and its base $b1$ connected to the negative bus 454 through the resistor R15. The emitter of the transistor Q4 is connected to the common terminal 488 of a capacitor C6 and a resistor R12, which are connected in series between the potentiometer R11 and the bus 472; the capacitor C6 being connected to the bus 454 and the resistor R12 being connected to the potentiometer R11 and thereby to the positive bus 472 through the resistor R10.

The common terminal 489 of the base $b1$ of the transistor Q4 and resistor R15 is connected to drive a one-shot multivibrator 495. This multivibrator amplifies and stretches the output pulses of the second oscillator 473 and comprises resistors R14, R16, R17, R18, R19 and R20 and transistors Q7 and Q8 together with capacitor C7 and diode CR2. More specifically, the terminal 489 is connected through the resistor R14 to the base of the transistor Q7. This transistor Q7 has its collector connected to the positive bus 472 through the resistor R16 and its emitter connected to the negative bus 454. The diode CR2 is connected between the negative bus 454 and the base of the transistor Q7 to limit the reverse voltage which may be applied therebetween. Resistors R16, R17 and R20 are connected in series between the buses 472 and 454. The emitter-collector circuit of the transistor Q7 is connected in shunt with the resistors R17 and R20. The base of the transistor Q8 is connected to the common junction of the resistors R17 and R20. The collector of this transistor Q8 is connected to the positive bus 472 through the resistor R19 and the emitter is connected to the negative bus 454.

The amplifier 479 is actuated from the output terminal 499 of the one-shot multivibrator 495 and comprises the amplifying transistors Q6 and Q9 and their associated circuitry. The potential of the output terminal 486 of the amplifier 497 is normally maintained substantially that of the positive bus 472 as long as the transistor Q9 conducts. However, upon the occurrence of a control signal at the output terminal of the multivibrator 495, it becomes non-conductive and the potential at terminal 486 becomes substantially that of the negative bus 454 (see curve PQ9). The duration of this negative bus potential is 10 degrees based upon the output frequency of the inverter. This duration is in contrast to the approximate 5 degrees or less output pulse at the output terminal 476 of the first unijunction relaxation oscillator 471.

The ring counters 458 and 460, referred to above, comprise a series of controlled rectifiers CR27m–CR27x (counter 458) and CR10a–CR10e (counter 460). These controlled rectifiers are sequentially rendered conducting in response to the applications of the shift signals (Pm–Px and Pa–Pl) to the shift buses 484 and 478. The shift signals are supplied to the bus 478 in a 5° leading phase relation with respect to the shift signals supplied by the bus 484. The signals on any one shift bus are 30° apart in that the turn-on and turn-off signals are supplied each 30 electrical degrees to the power stages A–F.

The ring counter 458 includes a transistor Q10 which has its base connected through a resistor R97 to a control terminal 491 and therefrom via conductor 490 to the output terminal 489 of the oscillator 473. The collector of the transistor Q10 is connected to the common terminal of a capacitor C13e and a diode CR28e. The emitter of this transistor Q10 is connected to terminal 492 and therefrom to terminal $e^1$ of the ring counter 460 via conductor 493. This terminal $e^1$ is periodically connected to the negative bus 454 upon conduction of the controlled rectifier CR10e. One terminal of the capacitor C13e is connected to the positive bus of the ring counter 458 through the rectifier CR28e and a current limiting resistor. The other terminal of the capacitor is connected through a diode CR34r to the gate of the controlled rectifier CR27r and to the negative bus through a resistor R37e.

With this arrangement, the capacitor C13e is normally maintained in a fully energized condition whereby no charging current will flow therethrough to fire the controlled rectifier CR27r. When, however, the rectifier CR10e of the ring counter 460 conducts, the rectifier CR10e completes the emitter-cathode circuit of the transistor Q10. Shortly after this occurs, the oscillator 473 energizes its output terminal and base drive current is supplied to the transistor Q10 over the conductor 490. This causes the capacitor C14e to discharge (curve CC13e) so that upon the next energization of the terminals 494–482 the controlled rectifier CR27r will be fired (to provide the pulse Pr) by the charging current through the capacitor C13e. A sequence of the ring counter 458 is thereby initiated.

This interconnection between the ring counter 458 and 460 insures the necessary relative sequence in the rendering of their controlled rectifiers conductive and thereby the proper sequence in the rendering of the power carrying controlled rectifiers TR1–TR12 conducting and the proper sequence in the rendering of the power flow extinguishing controlled rectifiers SCR1–SCR12 conducting to properly terminate conduction through the power carrying rectifiers TR1–TR12.

The ring counter 460 is normally prevented from responding to the shift signals (PQ1) supplied thereto over the shift bus 478 due to the conduction of the controlled rectifier CR86. This rectifier CR86 has its anode and cathode circuit shunt connected with the firing capacitor C81 whereby no charging current can flow-through the gate circuits of the controlled rectifier CR10a as long as the controlled rectifier CR86 remains conducting. Subsequent to the closure of the start switch STSW and prior to the operation of the relay M1, the contacts M1d will be closed and the conductor 496 will be maintained at the potential of the positive bus 450. Under these conditions, gate current flows to the controlled rectifier CR86 and it thereby remains conductive to hold the capacitor C81 discharged in much the same way as the Kueber contacts 66 maintain the Kueber capacitor 44a discharged.

The positive buses of the ring counters 458 and 460 are energized from the source 452 through the resistor R3, bus 472, transistors Q1 and Q9, and conductors 478 and 484. The resistor R3 and capacitor C3 act in much the same manner as the Kueber resistors 34 and 36 and capacitor 58 so that upon initial closure of the start switch STSW none of the controlled rectifiers of the ring counters will become conducting as a consequence of the initial energization thereof.

It is believed that the remainder of the details of construction with respect to the form of the invention shown in FIGS. 3A, 3B, 3C, 4 and 5 may best be understood by a description of the operation thereof which is as follows: When it is desired to operate the inverter, the start switch STSW is closed at some instant represented by time T0 in FIG. 6. This closure of switch STSW connects the positive terminal of the battery 452 to the positive bus 450 and the buses 450 and 454 are energized with a unidirectional potential. Current then flows from the positive bus 450 through the flux setting windings of the transformer of the power stages A through F, the resistor R1, the normally closed contacts M1a to the negative bus 454 whereby the cores of the transformers of the power stages A through F are each saturated in a preset direction, as indicated by the curves FLA–FLF. This insures that undesired saturation of the cores does not occur during the starting operation.

Concurrently with the flux setting operation, current flows from the positive bus 450 through the capacitor C1, the resistor R99 and the normally closed contacts M1c of the relay M1 to the negative bus 454. This charges the capacitor C1 with its terminal adjacent the positive bus 450 positive with respect to the common connection 470. The magnitude of this charge is substantially equal to that of the battery 452, as indicated by curve CC1 of FIG. 6.

Energization of the bus 450 results in energization of the bus 472 because of its connection with the bus 450 through the resistor R3. After the capacitor C3 charges sufficiently, oscillator of the unijunction oscillators 471 and 473 commences to provide periodic pulses PQ3 and PQ4.

With the bus 472 energized, charging current for the capacitors C4 and C6 flows therefrom through the resistors R9, R10, R11 and R12 through obvious circuits. When the potential of the capacitors C4 and C6 reach their respective critical values, the associated unijunction transistors O3 and Q4 respectively will conduct long enough to discharge the respective capacitors. Thereafter the capacitors will recharge and be discharged in endless sequence for periodically raising the potential of the bases $b1$. The magnitude of the resistance of the resistor R10 determines the frequency of the discharging of the capacitors and the setting of the movable element of the potentiometer resistor R11 determines the phasing of the pulses produced at base *b*1 of oscillator 471 with respect to the pulses produced at base *b*1 of oscillator 473. As discussed above, the frequency of these pulses or oscillations will perforce be 12 times the output frequency of the inverter since each of the six power stages must be actuated twice, once in a first polarity and once in a second polarity for each output cycle of the inverter. The pulses PQ3 produced by the oscillator 471 should be phased ahead of the pulses PQ4 produced by the oscillator 473. A satisfactory phase displacement is 5 degrees when based on the output frequency of the inverter.

An increase in potential at base *b*1 of transistor Q3 causes drive current to flow in transistor Q5 which thereupon conducts to supply base drive to normaly blocked transistor Q2. The rendering of the transistor Q2 conducting decreases the base drive current through the normally conducting transistor Q1 which thereupon effectively terminates its emitter-collector condition and the potential of the output terminal decreases from substantially that of the positive bus 472 to which it is raised by the conduction of transistor Q1 to substantially that of the negative bus 454. The duration of this reduction in potential is determined by the discharge time of the capacitor C4 through resistor R8 and in terms of the output frequency may be in the order of 5 degrees or less. The potential of the terminal 476 is represented by the curve PQ1.

Similarly the periodic conduction of the unijunction transistor Q4 periodically causes the potential of the output terminal 489 to be periodically elevated above that of the negative bus 454 for intervals of the same general time length as is the output terminal 476 by the oscillator 471. The output signals or pulses PQ4 of the transistor Q4 are used to actuate a "one-shot" multivibrator 495 which has a time period considerably larger than the pulse time period of the oscillator 473. The pulses PQ4 are also used to pulse the conductor 490 for initiating the operation of the ring counter 458 in the proper time sequence with respect to the ring counter 460. The energization of the terminal 491 by conductor 490 is without immediate effect on the ring counter 458 since capacitor C13*e* is charged and the shunting transistor Q10 is at this time held non-conductive because the connection of the terminal *e*¹ to the negative bus is open circuited by the blocked rectifier CR10*e* of the counter 460. Since the capacitor C13*e* remains charged, no gate signal can flow to the controlled rectifier CR27*r*.

The energization of the terminal 491 will, however, cause the normally blocked transistor Q7 to conduct and thereby the normally conducting transistor Q8 to become non-conducting for a time interval greater than the time interval of the increase in potential of the terminal 489. During the time period that the potential of the terminal 489 is raised above that of the negative bus 454, the drive current flows through resistor R14 to the transistor Q7 which thereupon conducts. Since the emitter-collector circuit of this transistor Q7 shunts the resistors R17 and R20, its conduction will terminate the base drive current to the transistor Q8 which thereupon becomes non-conductive. At the same time base drive current was flowing to the transistor Q7, current was flowing through resistor R14, capacitor C7 and resistor R18 and R16. This substantially reduces the charged condition of the capacitor C7 from that which existed at the end of the preceding non-conducting period of the transistor Q7. When the conducting period of the transistor Q4 terminates, the potential of the terminal 489 decrease toward that of the bus 454 and the charge on the capacitor C7 increases. The path of the resulting charging current extends through the base of the transistor Q7 and the transistor Q7 remains conducting. This additional time period coupled with the conducting time period of the transistor Q4 provides the desired 10-degree blocked interval of the transistor Q9, which as will be brought out below, is desirable for initiating operation of the ring counter 458. The curve PQ9 illustrated the potential of the output terminal 486.

Energization of the positive bus 450 also energized the start bus 496 through the normally closed contacts M1*d* of the relay M1. This results in a current flow through the start terminal 494 and resistors R71 and R72 to the negative bus 480 of the ring counter 460 which is connected to the negative bus 454. The voltage appearing across the resistor R72 is sufficient to supply a gate current to the controlled rectifier CR86 to maintain it in a condition to shunt the capacitor C29 and thereby preventing the flow of charging current thereto when the positive bus 479 is rendered conducting by the pulsating potential PQ1 applied by the conductor 478 from the output terminal 476 of the first unijunctional relaxation oscillator. The conducting condition of controlled rectifier CR86 is illustrated by curve CCR86. This insures that the ring counter 460 will not operate prematurely but will be delayed for a predetermined time period (TD1) which must elapse between closure of start switch STSW and the actuating of relay M1.

At the end of the predetermined time interval T1, which is primarily controlled by the capacitor C3 and resistor R3, the relay M1 will open its normally closed contacts M1*a*, M1*c* and M1*d* and close its normally opened contacts M1*b*. Closure of the contacts M1*b* initiates the charging of the timing capacitor C2 connected in shunt with the energizing winding of the relay M2 and in series with the timing resistor R2.

Opening of the contacts M1*a* interrupts the flux setting current through the transformer of the power stages A–F. Opening of the contacts M1*c* interrupts the initial charging circuit for the capacitor C1 which extends from the positive bus 450 through the capacitor C1, current limiting resistor R99 and contacts M1*c* to the negative bus 454. Subsequent energy for the capacitor C1 will be obtained from the power stages A–F as the controlled rectifiers SCR1–SCR12 are rendered conducting by the ring counter 458, see curve CC1.

Opening of the normally closed contacts M1*d* deenergizes the start bus 496 which interrupts the gate current flow through the controlled rectifier CR86 (curve CCR86) so that the next time that the first unijunctional oscillator 471 renders its output terminal 476 negative, further current flow through the controlled rectifier CR86 is terminated. Thereafter, when the terminal 476 is rendered positive (pulse PQ3), charging current flows from the positive bus 472, through transistor Q1, bus 478, terminal 479, resistor R85*l*, diode CR91, capacitor C81, conductor 498, diode CR11*a*, gate to cathode of the controlled rectifier CR10*a*, resistor R26*a* and terminal 480 to the negative bus 454. This flow of charging current for the capacitor C8*l* causes the controlled rectifier CR10*a* to conduct, anode to cathode, and establish current flow through the resistor R85*a*, diode CR9*a*, the controlled rectifier CR10*a* and resistor R26*a* to the negative bus 454. The resulting elevation in the potential of its output terminal *a* (illustrated by curve P*a*) supplies gate current to the controlled rectifiers TR1, TR11 and TR12. The controlled rectifier TR11 and TR12 cannot be made conducting because of the conducting condition of transistor Q11 as indicated by curve PQ11 and the resulting elevation (pulse P*a*) initiates conduction of the controlled rectifier TR1 and a gradual change in flux, see curve FLA.

Conduction of the controlled rectifier CR10*a* also establishes a discharge circuit for the previously charged capacitor C8*a* which discharges therethrough and through the resistors R26*a* and R27*a*. At the next pulse PQ1, the capacitor C8*a* will be recharged to fire the next one of the controlled rectifiers of the ring counter 460.

A more complete description of the ring counter 460 is set forth in the copending Kueber application. It is sufficient for the purposes of this application to be aware that each time the potential is removed from and reestablished between the terminals 479 and 480 (curve PQ1) the conducting one of the controlled rectifiers CR10a–CR10l will be shifted in endless ring fashion. As the rectifiers CR10a–CR10l are rendered conducting and non-conducting their associated output terminals A–1 will be periodically raised and lowered in potential, as illustrated by curves Pa–Pl.

The ring counter 458 steps the energized condition of its output terminals each time that the potential between the terminals 481 and 482 is interrupted and reestablished by the oscillator 472, as illustrated by the curves Pm–Px. The ring counter 458 differs from the ring counter 460 in that it does not contain a link between the controlled rectifier CR27q and the controlled rectifier CR27r.

The firing of rectifier CR27r is controlled by capacitor C13e which is normally maintained charged but which is discharged through the transistor Q10 under the joint control of the oscillator 473 and the counter 460. The pulsing of the counter 458 commences with firing of the rectifier CR27r and terminates with the firing of the rectifier CR27q. Each new sequence thereof is started by first discharging the capacitor C13e and thereafter charging this capacitor through the gate of the rectifier CR27r. The discharging of the capacitor C13e occurs as a consequence of the concurrent conduction of the path $e^1$ of the ring counter 460 and the raising of the potential at oscillator terminal 489. Conduction of path $e^1$ occurs as a consequence of the stopping of the ring counter 460 by the pulses PQ1. The conducting state for the transistor Q10 is achieved due to the base-drive of the transistor Q10 derived from conductor 490.

During the time interval before the ring counter 460 fires its controlled rectifier CR10e to energize its output terminal e, the terminal $e^1$ is effectively disconnected from the negative bus 454 and the emitter-collector circuit of the transistor Q10 is open circuited. Therefore, the base current has no path to the transistor Q10 which remains ineffective to conduct and discharge the capacitor C13e. As long as the capacitor C13e retains its charge, no gate signal flows to the controlled rectifier CR27r as a consequence of the potential pulses PQ4 supplied from the second unijunction relaxation oscillator 473.

When however the controlled rectifier CR10e of the ring counter 460 fires to supply the pulse Pe, it connects the output terminal $e^1$ to the negative bus to complete the base-emitter circuit of the transistor Q10 so that the next subsequent one of the potential pulses PQ4 renders the transistor Q10 conducting (see curve PQ10) to discharge the capacitor C13e. This occurs at time $T_2$. The next positive pulse (PQ9) supplied by the pulsating conductor 484 causes the controlled rectifier CR27r to conduct. Conduction of CR27r energizes the transformer in its anode circuit and provides an output potential to the valve SCR6 (time $T_3$).

The controlled rectifier SCR6 thereupon becomes conducting and the capacitor C1 discharges through the right-hand half of the primary winding of the transformer of the stage F and through the inductance L1. This discharge of the capacitor C1 is without effect upon the flux in the core of the stage F transformer since it had already previously been saturated during the initial time interval TD1 subsequent to the closing of the start switch STSW. It does serve however to recharge the capacitor C1 in a reverse direction in which the common connection 46 is positive with respect to the positive bus 450 and by an amount which is substantially twice that of the battery 452. This is due to the free wheeling effect caused by the presence of the inductance L1 in circuit with the capacitor C1.

Thereafter at time $T_4$, the ring counter 460 will energize its output terminal f and the controlled rectifier TR6 will be fired to energize the primary winding of the transformer F between the positive and negative buses 450 and 451. The two ring counters 458 and 460 will continue to supply their pulses Pm–Px and Pa–Pl in the proper sequence to energize and deenergize the transformers of the stages A–F. The ring counter 460 will continue to supply its pulses in endless sequence under control of the oscillator 471. The ring counter 458 must be restarted each time it completes a sequence as represented by the pulses Pr–Px, Pm–Pq in the manner just described in connection with the initiation of the initial sequence.

The capacitor C2 and resistor R2 times the operation of the relay or breaker M2 such that the relay M2 closes its contacts subsequent to the interval required to energize the transformers of the stages A through F in a direction of positive saturation, as indicated by the curves FLA–FLF. With this arrangement, the earlier to-be-energized transformers cannot cause any change in the initial flux condition of the others as established during the time period TD1. After all of the transformers have been energized from the battery 452 in the proper sequence, the relay M2 may close its output terminals at time $T_6$ to connect the conductors 464, 466 and 468 to the network supplied thereby (not illustrated). The time interval TD2 should be sufficient to permit all of the controlled rectifiers TR1–TR6 to be rendered conducting but, if desired for any reason, may be longer than this interval.

At the time $T_5$, pulse Ps renders the controlled rectifier SCR7 conducting to cause the capacitor C1 to discharge through the inductance L1, bus 456, anode to cathode of the controlled rectifier SCR7, the right-hand half of the primary winding of the transformer of stage A and the positive bus 450 back to the capacitor C1. The potential across the capacitor C1 due to the free wheeling effect of the inductance L1 is approximately twice that of the battery 452 and is sufficiently greater than the potential appearing across the right-hand half of the primary winding of the transformer of stage A to override the voltage supplied through the controlled rectifier TR1 to the left-hand portion of the primary winding. The discharge of the capacitor C1 thereby interrupts the current flow through the controlled rectifier TR1 and it becomes extinguished.

The relative magnitudes of the capacitor C1 and the inductor L1 must have a time constant which is sufficiently long for the controlled rectifier TR1 to regain control. If this were not so, the rectifier TR1 might reconduct even though no gate signal were applied thereto. The time constant must be sufficiently short so that the duration of the current flow is less than the 30-degree interval between the sequential operation of the power stages by an amount which is equal to the reforming time of the controlled rectifiers SCR1 to SCR12. This is so because these controlled rectifiers are operated at a 30 degree frequency and the LC pass-around extinguishing network would be connected to more than one of the power stages which is not desirable. Furthermore, it is desirable that the effect of the extinguishing circuit be of short duration so that the control of the power stage is transferred back to the controlled rectifier TR7 to permit firing thereof as soon as possibe as determined by the power factor of the load connected to the conductors 462, 464, 466 and 468.

The output terminals g, h, and i are all connected to the gate of the controlled rectifier TR7. This insures that a gate signal is supplied thereto throughout approximately 90 degrees of the wave of the output potential of the inverter. This makes possible the firing of the rectifier TR7 irrespective of the lagging power factor of the load which is supplied by the inverter. If the load were unity power factor, the controlled rectifier TR7 will be rendered conducting by the pulse Pg. If the power factor is somewhat lagging, the controlled rectifier TR7 will be rendered conducting as soon as the load current flow through the transformer terminates.

The operation of the power stages B, C, E, and F follow in sequence and are substantially the same as described above in connection with power stage A.

In order to eliminate any possibility of the rendering of the controlled rectifiers TR7–TR12 conductive prior to the rendering of the rectifiers TR1–TR6 conductive, a gate signal shorting circuit is established between the gates of the controlled rectifiers TR7–TR12 and the negative bus 454 through a transistor Q11. The transistor Q11 has its emitter connected to the bus 454 and its collector connected to a bus 500 which is connected to each of the gates of the controlled rectifiers TR7 and TR12 through blocking diodes. The base of the transistor Q11 is connected through a diode CR88 to the anode of a controlled rectifier CR89. The anode of the controlled rectifier is connected through a resistor R101 to the positive bus 472 and the cathode is connected to the negative bus 454. Therefore, whenever the controlled rectifier CR89 is not conducting, the potential of the base of the transistor Q11 will be elevated and supplied a base drive thereto to maintain the potential of the bus 500 substantially at that of the negative bus 454 to prevent any firing of the controlled rectifiers TR7–TR12.

The controlled rectifiers CR89 is rendered conducting to turn off the transistor Q11 to permit gate signals to be supplied from the ring counter 460 to the controlled rectifiers TR7–TR12. For this purpose, the gate of the controlled rectifier CR89 is connected through a diode CR90, a resistor R100 and a conductor 502 to the output terminal *f* of the ring counter 460. Since the controlled rectifier CR89 is a thyratronic type of device and it is connected across a D.C. source, it will continue to conduct once that it has been fired by the ring counter and the transistor Q11 will remain non-conductive to shunt the pulses Pg–Pl.

Although the invention has been described with reference to certain specific embodiments, numerous modifications are possible. Consequently, the embodiments herein set forth are to be construed in an illustrative rather than a limiting sense.

What is claimed and is desired to be secured by United States Letters Patent is as follows:

1. In an apparatus of the character described; a plurality of integral inverters; each said inverter including a pair of input terminals, a pair of output terminals, a pair of current controlling devices each having a pair of terminals and being operable upon being rendered conductive to pass current between its said terminals, and at least one current path interconnecting said pairs of terminals and including said terminals of a first of said controlling devices; a sequencing network operatively conected to each of first devices for rendering said first devices conductive in sequence; a first bus; a current interrupting switch; means connecting a corresponding one of said terminals of each of said first devices to said first bus; a second bus; means connecting said interrupting switch between said busses; means connecting a corresponding one of said terminals of each of a second of said devices to said second bus; each said inverter having the other terminal of its said second current controlling device connected to a point in said inverter which has the same instantaneous potential polarity as the other terminal of its said one current controlling device; and means connecting said sequencing network to said second current controlling devices for actuation of said second current controlling devices in timed sequence with respect to the actuation of said first devices.

2. In an apparatus of the character described; a plurality of integral inverters; each said inverter including a pair of input terminals adapted to be energized by a source of unidirectional potential electrical energy, a pair of output terminals adapted to be connected to an electrical load, a plurality of current controlling devices each having a pair of terminals and being operable upon being rendered conductive to pass current between its said terminals, and at least first and second electrical energy conducting paths connecting said pairs of terminals; each said first path of each said inverter including said terminals of a first controlling device of said plurality of controlling devices associated therewith, each said second path of each said inverter including said terminals of a third controlling device of said plurality of controlling devices associated therewith; each said first and third device having a first of its said terminals connected to the input terminal end of the said path with which it is associated and having a second of its said terminals connected to the output terminal end of the said path with which it is associated; first and second busses; a single current interrupting apparatus connected to control current flow between said busses; means connecting said first bus to said first terminals of said first and third devices; each said inverter having first and second shunting paths individually connecting said second terminals of its said first and third devices to said second bus and respectively including said terminals of a second and a fourth of its said plurality of control devices; and a sequencing network connected to said control devices and adapted to render conductive in sequence said fourth and first devices of each said inverter and thereafter said second and third devices of each said inverter; said sequencing network further being operable to render said current interrupting device effective to interrupt the current flow therethrough prior to the rendering of each of said first and third current controlling devices conductive.

3. In an apparatus of the character described; a plurality of integral inverters; each said inverter including a pair of input terminals adapted to be energized by a source of unidirectional potential electrical energy, a pair of output terminals adapted to be connected to an electrical load, a plurality of current controlling devices each having a pair of terminals and being operable upon being rendered conductive to pass current between its said terminals, and at least first and second electrical energy conducting paths connecting said pairs of terminals; each said first path of each said inverter including said terminals of a first controlling device of said plurality of controlling devices associated therewith, each said second path of each said inverted including said terminals of a third controlling device of said plurality of controlling devices associated therewith; each said first and third device having a first of its said terminals connected to the input terminal end of the said path with which it is associated and having a second of its said terminals connected to the output terminal end of the said path with which it is associated; first and second busses; a single current interrupting apparatus connecting to control current flow between said busses; means connecting said first bus to said first terminals of said first and third devices; each said inverter having first and second shunting paths individually connecting said second terminals of its said first and third devices to said second bus and respectively including said terminals of a second and a fourth of its said plurality of control devices; a sequencing network connected to said control devices for rendering conductive in sequence said fourth and first devices of each said inverter and thereafter said second and third devices of each said inverter; said sequencing network further rendering said current interrupting device effective to interrupt the current flow therethrough prior to the rendering of each of said first and third current controlling devices conductive; each said shunting path including means establishing a voltage differential between its said device and the said second terminal to which said shunting path is connected.

4. In an apparatus of the character described; a single current interrupting apparatus; a plurality of integral inverters; each said inverter including a pair of power input terminals, a transformer having a winding with end terminals and an intermediate terminal, a plurality of discontinuous control type electric valves, a first current path connecting said input terminals with said intermediate terminal and one of said end terminals and including a first of said valves, a second current path connecting said input terminals with said intermediate terminal and the other of said end terminals and including a third of said valves, a first shunting circuit connected in parallel with said first valve and including said interrupting apparatus and a second of said valves, and a second shunting circuit connected in parallel with said third valve and including said interrupting apparatus and a fourth of said valves; a sequencing network connected to said valves, said sequencing network initiating sequential conduction of said fourth and said first valves of each of said inverters in sequence and thereafter initiating sequential conduction of said second and said third valves of each of said inverters in sequence; said sequencing network further being connected to said interrupting apparatus to render said interrupting apparatus effective to interrupt current flow therethrough subsequent to the rendering of each said fourth valve conductive and prior to the rendering of each said first valve conductive and also subsequent to the rendering of each said second valve conductive and prior to the rendering of each said third valve conductive.

5. In an apparatus of the character described; a single current interrupting apparatus; a plurality of integral inverters; each said inverter including a pair of power input terminals, a transformer having a winding with end terminals and an intermediate terminal, a plurality of discontinuous control type electric valves, a first current path connecting said input terminals with said intermediate terminal and one of said end terminals and including a first of said valves, a second current path connecting said input terminals with said intermediate terminal and the other of said end terminals and including a third of said valves, a first shunting circuit connected in parallel with said first valve and including said interrupting apparatus and a second of said valves and a portion of said winding intermediate said first end terminal and said intermediate terminal, and a second shunting circuit connected in parallel with said third valve and including said interrupting apparatus and a fourth of said valves and a portion of said winding intermediate said other end terminal and said intermediate terminal; a sequencing network connected to said valves, said sequencing network initiating sequential conduction of said fourth and said first valves of each of said inverters in sequence and thereafter initiating sequential conduction of said second and said third valves of each of said inverters in sequence; said sequencing network further being connected to said interrupting apparatus, said sequencing network rendering said interrupting apparatus effective to interrupt current flow therethrough subsequent to the rendering of each said fourth valve conductive and prior to the rendering of each said first valve conductive and also subsequent to the rendering of each said second valve conductive and prior to the rendering of each said third valve conductive.

6. In an apparatus of the character described; first and second busses; a single current interrupting device connected between said busses; a plurality of integral inverters; each said inverter comprising a pair of input terminals, an output transformer having a winding with end terminals and an intermediate terminal, said winding further having a first connection intermediate a first of said end terminals and said intermediate terminal and a second connection intermediate a second of said end terminals and said intermediate terminal, a plurality of three elements semiconductor devices of the type in which a signal supplied between one pair of said terminals controls the initiation of current flow between a second pair of said terminals but which is ineffective to interrupt said current flow, means connecting said second pair of said terminals of a first of said devices between said first end terminal and one of said pair of input terminals, means connecting said one input terminal to said second bus, means connecting said second pair of said terminals of a second of said devices between said first connection and said first bus, means connecting said second pair of said terminals of a third of said devices between said second end terminal and said one input terminal, means connecting said second pair of said terminals of a fourth of said devices between said second connection and said first bus.

7. In a multi-power stage inverter, a plurality of integral inverting units, each said unit including a first switching device, each said first switching device being effective when conductive to conduct the power current of the said unit which it is associated, each said first switching device being unable to interrupt its said power current, first means rendering said first switching devices conductive, a current interrupting network, said current interrupting network including a current interrupting valve, second means sequentially connecting said valve in shunt circuit with each of said first switching devices, and means for first rendering said valve conductive and thereafter non-conductive each time said valve is shunt connected with a said switching device to interrupt sequentially the current flow through said first devices.

8. In a multi-power stage inverter, a plurality of integral inverting units, each said unit including a first switching device of the discontinuous control type, said device being operable to control the initiation of current flow therethrough and ineffective to interrupt current flow therethrough once it has been initiated, each said unit including a second switching device, means sequentially actuating said first devices into their conductive condition, a shut-off switching device, means connecting said shut-off device to each of said units through said second devices to provide a plurality of series circuits, said series circuits having said shut-off device in common and being individually in parallel with said first devices, and means rendering said shut-off device conductive and then substantially non-conductive each time one of said second switching devices is rendered conductive.

9. In an apparatus for inverting unidirectional potential energy to alternating potential energy; a plurality of integral electrical inverters; each said inverter comprising first and second electric valves, a pair of input terminals, a pair of output terminals, and first and second electrical energy conducting paths, said first path connecting said first pair of input terminals to said pair of output terminals; said first path including said first valve for controlling the initiation of energy flow therethrough, said second path including said second valve for controlling the initiation of current flow therethrough; a pair of busses; a single current interrupting network connected between said busses; circuit means connecting each said second path across said busses; sequencing means connected to said first and second valves and effective to render said first valves conductive in predetermined sequence and to render said second valve of each said inverter conductive subsequent to the said first valve of the same said inverter being rendered conductive.

10. The combination of claim 9 in which said sequencing means regulates the duration of the time period between the rendering of said first and second valves conducting of each said inverter to be the same time duration.

11. The combination of claim 10 in which all of said valves are of the discontinuous control type in which the initiation of current flow therethrough is controlled thereby but which valves are ineffective to interrupt the flow of current therethrough, and in which said interrupting network is effective to interrupt the current flow therethrough at the end of a predetermined time interval less than the time interval between the successive renderings of said second valves conductive whereby solely one of said inverters is connected to said busses at any one instant.

12. The combination of claim 11 in which said interrupting network comprises an energy storage device.

13. The combination of claim 11 in which said interrupting network comprises a reversibly charged storage device.

14. The combination of claim 11 in which said interrupting network comprises a capacitor series connected with an inductance.

15. The combination of claim 11 in which said interrupting network comprises a continuous control type electric valve for interrupting the flow of current between said busses.

16. The combination of claim 10 in which each said inverter includes a transformer having a winding with turns, each said first and second path of each said inverter including at least some turns of said winding of the said transformer included in the respective said inverter, each said inverter being constituted such that the number of said turns in its said second path and the polarity of the voltage induced in said turns of its said second path are so related to the number of said turns in its said first path and the polarity of the voltage across said turns in its said first path that the rendering conductive of its said second valve will reverse the potential across its said first valve will cease conducting.

17. The combination of claim 16 in which said paths of each said inverter are connected in shunt with each other across the said input terminals of the respective said inverter.

18. The combination of claim 17 in which each said inverter is arranged such that the number of said turns in its said first path is greater than the number of said turns in its said second path.

19. The combination of claim 17 in which certain of said inverters are arranged such that some of said turns of said second path are separate from some of said turns of said first path.

20. In an apparatus for inverting unidirectional potential energy to alternating potential energy; first and second and third buses; first and second power stages; each said stage including a pair of power input terminals, a transformer, and first, second, third and fourth discontinuous control type valves; each said transformer having winding means provided with first, second, third, fourth and fifth terminals; each said valve having a main path and a control circuit for controlling the initiation of current flow through its respective said main path and being ineffective to interrupt the current flow through its respective said main path; each said power stage having first energy conducting means connected between its said second terminal and its said first bus, second energy conducting means connected between its said second terminal and its said first bus, third energy conducting means connected between its said third terminal and said second bus, fourth energy conducting means connected between its said fourth terminal and said second bus, said first and said second and said third and said fourth energy conducting means individually including said main paths of its said first and said second and said third and said fourth valves respectively; a capacitor; an inductor; means connecting said capacitor and said inductor in series between said first and third buses; sequencing means connected to said control circuits of each said power stage for actuation of said first and second control circuits of said first power stage and thereafter said third and second control circuits of said second stage and thereafter said third and fourth control circuits of said first stage and thereafter said first and fourth control circuits of said second stage; and each said stage comprising a fifth energy conducting means connecting said fifth terminal to said third bus.

21. The combination of claim 20 in which said terminals of said winding of each said stage is arranged such that at a given instant in time said first and said second terminals are of the same polarity with respect to its said fifth terminal and of opposite polarity with respect to its said third and fourth terminals.

22. The combination of claim 20 in which said first and third valves of said first power stage are polarized to conduct in the opposite direction with respect to said first bus than are said first and third valves of said second power stage.

23. The combination of claim 22 in which the time constant of the half cycle of oscillation of said capacitor and said inductance between said first and third buses is less than the time interval between the actuation of any two of said control circuits associated with said valves having their main circuits connected to said second bus.

24. In an apparatus of the character described; first and second busses; a current interrupting device connected between said busses; a plurality of inverters; each said inverter comprising a pair of input terminals, an output transformer having a winding with first and second end terminals and an intermediate terminal intermediate said first and second terminals, said winding further having a first connection and a second connection, a plurality of three element semiconductor devices of the type in which a signal supplied between one pair of said terminals controls the initiation of current flow between a second pair of said terminals but which is ineffective to interrupt said current flow, means connecting said second pair of said terminals of a first of said devices between said first winding terminal and one of said pair of input terminals, means connecting said one input terminal to said second bus, means connecting said second pair of said terminals of a second of said devices between said first connection and said first bus, means connecting said second pair of said terminals of a third of said devices between said second winding terminal and said one input terminal, means connecting said second pair of said terminals of a fourth of said devices between said second connection and said first bus.

References Cited by the Examiner

UNITED STATES PATENTS

| | | |
|---|---|---|
| 2,239,437 | 4/1941 | Bedford. |
| 3,060,363 | 10/1962 | Jensen _____ 321—5 |
| 3,085,190 | 4/1963 | Kearns et al. _____ 321—45 |
| 3,181,053 | 4/1965 | Amato _____ 321—45 |
| 3,210,638 | 10/1965 | Walker _____ 321—45 X |

JOHN F. COUCH, *Primary Examiner.*

W. H. BEHA, *Assistant Examiner.*